Oct. 2, 1928.

J. A. GILMAN 1,686,446

PLANETARY TRANSMISSION MECHANISM

Filed April 15, 1926   3 Sheets-Sheet 1

Inventor

J. A. Gilman

By Lacey & Lacey, Attorneys

Oct. 2, 1928.
J. A. GILMAN
1,686,446
PLANETARY TRANSMISSION MECHANISM
Filed April 15, 1926   3 Sheets-Sheet 2
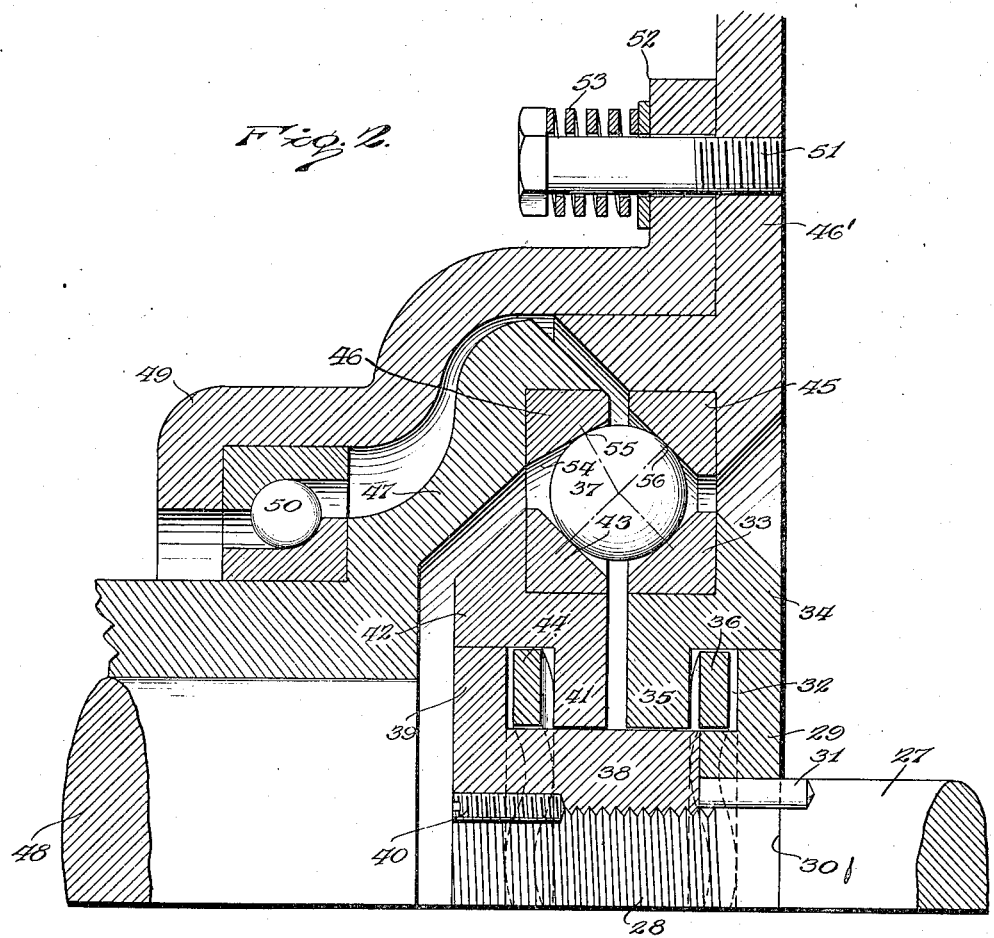
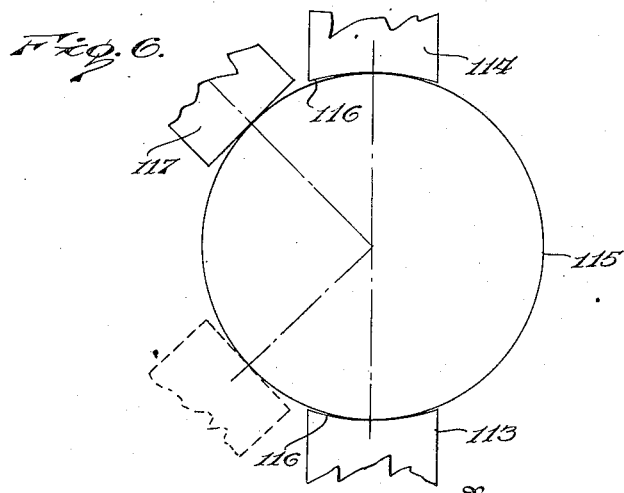
Inventor
J. A. Gilman
By Lacey & Lacey, Attorneys Oct. 2, 1928.
J. A. GILMAN
1,686,446
PLANETARY TRANSMISSION MECHANISM
Filed April 15, 1926    3 Sheets-Sheet 3
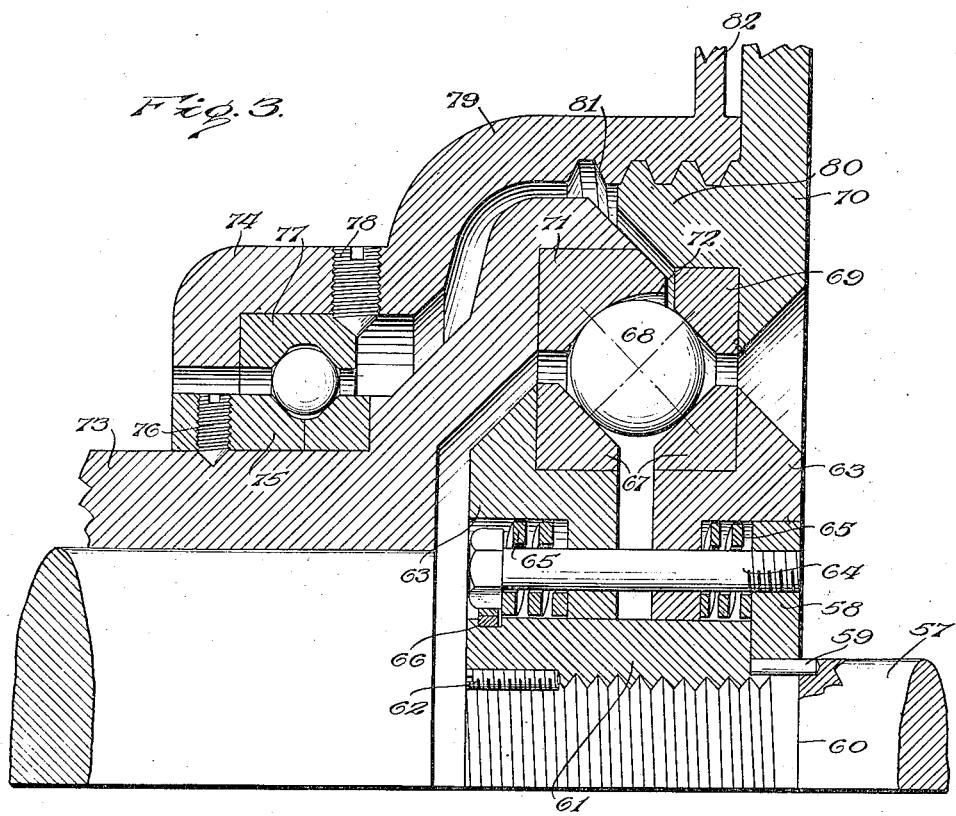
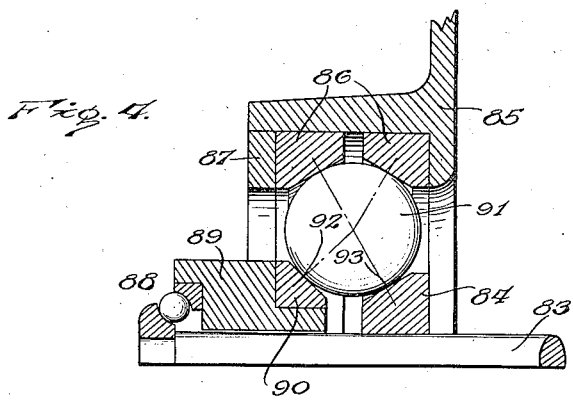
Inventor
J. A. Gilman
By Lacey & Lacey, Attorneys Patented Oct. 2, 1928.

1,686,446

UNITED STATES PATENT OFFICE.

JOHN A. GILMAN, OF SEATTLE, WASHINGTON.

PLANETARY TRANSMISSION MECHANISM.

Application filed April 15, 1926. Serial No. 102,251.

This invention relates to planetary transmission mechanisms and has special reference to that type in which intermediate rolling elements are in direct contact with both the driving member and the driven member, and the object is to transmit the motion through the intermediate member without the interposition of separators or other spacing or supporting devices. The invention is illustrated in the accompanying drawings and will be fully set forth in the following description having reference to the drawings, the novel features being subsequently particularly defined in the appended claims.

In the drawings:

Fig. 2 is a similar view showing a second embodiment of the invention;

Figs. 3 and 4 are similar views showing other embodiments and forms of the invention;

Figs. 5 and 6 are diagrams illustrative of the operation.

Figure 1:
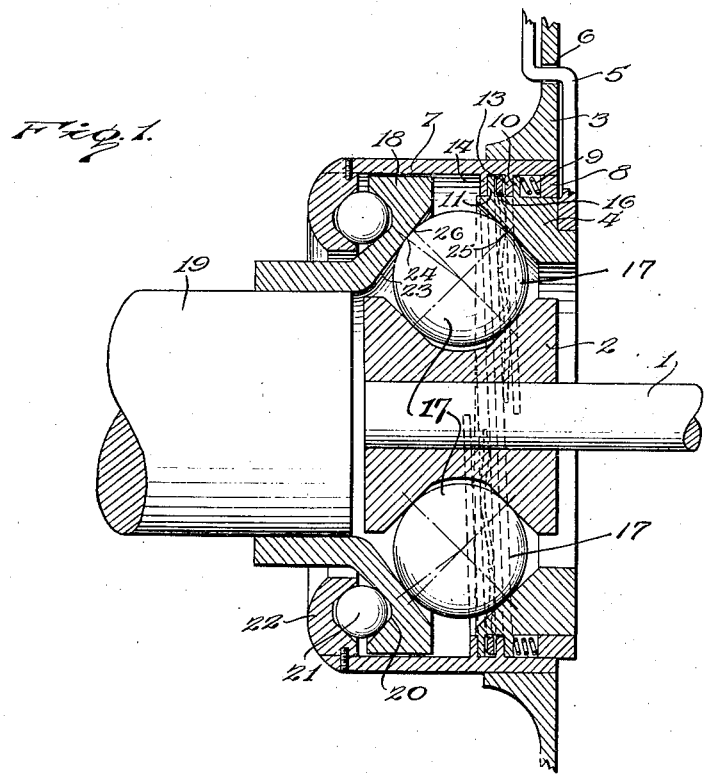
Figure 1 is a longitudinal section of one constructive embodiment of the invention.

Referring more particularly to Fig. 1, the reference numeral 1 indicates a driving shaft which may be rotated through connection with any convenient motor and upon the end of which is fixed a race 2. The reference numeral 3 indicates a portion of a supporting frame or motor casing and 4 indicates an outer race which is mounted in the frame or casing 3 and held against relative rotation. The race 4, however, may be shifted axially and to that end a lever or handle 5 is connected to the race in any convenient or preferred manner and is operable through a slot 6 provided in the frame or casing at any convenient point. An annular housing 7 is fitted around the race 4 and in the frame or casing 3 in such a manner that it cannot rotate therein, and at the inner end of this housing 7 is a shoulder or ring 8 which provides an abutment for a compression spring 9 disposed between the said ring and a thread or helical rib 10 provided on the outer circumference of the race 4. Preferably, the thread 10 is spaced axially from the outer side of the race and at the outer extremity of the race is a second thread or helical rib 11. The housing 7 is provided with internal threads or helical ribs 13 and 14 which are spaced apart in like manner as the ribs 10 and 11 and are disposed, respectively, at the outer sides of the ribs 10, 11, a leaf spring 16 or series of such springs being arranged between the threads 11 and 13 to cooperate with the spring 9. The springs 9 and 16 serve to maintain the rolling contact between the race 4 and the rolling transmission element 17, and either spring may be omitted or both may be employed accordingly as the invention is applied to a light or a heavy machine, as will be understood. When, for any reason, it is desired to release the rolling contact, the handle member 5 is moved laterally so that a relative rotary movement is imparted to the race 4 and this rotary movement, through the coaction of the obliquely disposed opposed faces of the engaging threads or ribs, will cause the race to move inwardly or away from the rolling elements 17 and thereby break the rolling contact. These coacting threads are illustrated merely as one means for shifting the race and other means for accomplishing the result may be employed without changing the essential characteristics of the invention. At the outer side of the rolling elements 17 and concentric with the race 2 is a race 18 which constitutes the driven element, and this race may be carried by or secured to a shaft 19 arranged in axial alinement with the driving shaft 1 or may be equipped at its outer end with gearing whereby the transmitted motion may be applied laterally. The outer surface of the race 18 is formed with an annular groove or raceway 20 receiving anti-friction balls 21 which are held thereto by a mating raceway 22 secured to the outer end of the housing 7. The working face 23 of the driven race 18 is formed upon a different angle than the working face of the race 4 so that the point of contact, indicated at 24, between the race 18 and the rolling elements 17 is at a different distance radially from the driving shaft than the point of contact 25 between the rolling element and the race 4. It will be understood, of course, that, while I have illustrated the rolling elements 17 as balls or spheres, they may be rollers of cylindrical or tapered form or cylindrical rollers with round ends and the particular shape of the transmitting rolling elements is immaterial.

When the driving shaft 1 is rotated, the inner race 2 will, of course, rotate with it and, by its contact with the spheres or rolling elements 17, will impart rotation to the latter and also tend to set up a rolling motion of the same whereby they will travel upon the relatively fixed race 4 in a circular orbit defined by the axes of the several spheres parallel with the axis of the driving shaft. If the rolling face 23 of the race 18 be disposed at the same angle as the working face of the race 4, the point of contact between the rolling element and the race 18 will be, as indicated at 26, at the same radial distance from the driving shaft as the point of contact 25 and, therefore, the rolling path of the balls upon the race 18 will be the same as the rolling path upon the race 4 and the structure will operate merely as a four point ball bearing, the race 18 remaining neutral or at rest. In the arrangement illustrated in Fig. 1, however, the path of the rolling elements upon the driven race is a circle of less diameter than the circle defined by the several points of contact 25 and, therefore, when the driving shaft is rotated, the race 18 will rotate in the same direction but at a slower speed. If the face of the race 18 be disposed at such an angle that the point of contact with the spheres 17 will be located radially beyond the neutral point 26, the race 18 will be driven in a direction the reverse of the direction of rotation of the driving shaft. By selecting a race having its working face disposed upon the proper angle of obliquity any desired speed or direction of rotation of the driven element may be obtained.

In Fig. 2, I have illustrated a further development of the invention in which the driving shaft is indicated at 27 and is provided with a reduced threaded end portion 28. A collar or flange 29 is fitted against the annular shoulder 30 of the driving shaft and is secured against relative rotation by a pin 31 in an obvious manner. The collar or flange 29 is provided with a recess 32 at its outer edge portion and an inner race 33 is fixed upon a race carrier 34 which seats upon the outer edge of the collar or flange 29 and has upon its inner circumference a rib 35 which cooperates with the collar to provide an outer wall for the recess 32, a spring 36 being fitted within the recess and bearing against the collar and the rib 35 so that the race carrier is yieldably held in position to maintain rolling contact between the race 33 and the transmitting rolling element 37. Threaded onto the end of the driving shaft is a sleeve 38 having an outer annular flange 39 and held against relative rotation and against withdrawal by a lock screw 40. The sleeve 38 provides a rest for the rib 35 of the race carrier 34 and also for the similar rib 41 upon a race carrier 42 upon which is fixed a race 43 cooperating with the race 33 to support the rolling elements 37. A spring 44 is interposed between the rib 41 and the flange 39 so that the race 43 will be yieldably maintained in rolling contact with the balls 37, and it will be understood that the friction between the opposed faces and the pressure exerted by the springs 36 and 44 will generally be sufficient to maintain the rolling contact between the races and the balls and also hold the race carriers against rotation relative to the driving shaft. An outer stationary race 45 is fixed to the frame 46′ of the machine, and this race 45, of course, has rolling contact with the elements 37 just as the race 4 in the previously described form of the invention has contact with the balls 17. The driven race 46 is carried by an annular member 47 which is fixed in any preferred manner to the driven shaft 48 and, to maintain the rolling contact between the race 46 and the balls 37, a housing 49 is provided around the race carrier 47 and fitted thereto through an antifriction bearing 50 so that the driven element may rotate freely. The housing 49 is secured to the frame 46′ by cap bolts 51 inserted through the annular flange 52 of the housing into the frame, and springs 53 are coiled around the projecting ends of the bolts between the heads thereof and the flanges 52 to yieldably hold the housing to the frame in an obvious manner. The yieldable mounting of the races enables the device to automatically compensate for wear and for possible imperfections in the contact surfaces. It should be noted that in Fig. 2 I have illustrated the working face 54 of the driven race 46 disposed upon such an angle that the point of contact 55 with the sphere 37 is radially beyond the point of contact 56 with the stationary race 45 so that the race 46 will be rotated in a direction the reverse of the direction of rotation of the driving shaft. It is to be understood, however, that in both described forms of the invention the driven race may be arranged so as to transmit the motion in the same direction as the driving race or races or in the opposite direction.

In Fig. 3, I have illustrated a further development of the invention in which the driven shaft 57 is of the same form as the shaft 27 shown in Fig. 2, and an annular member or flange 58 is secured thereon by a pin 59 against the shoulder 60. A sleeve or hub 61 is threaded onto the end of the shaft so as to abut the flange 58 and is held against withdrawal by a lock screw 62. The race carriers 63 correspond in form to the race carriers 34 and 42, shown in Fig. 2 and previously described, and in addition are provided with openings through their respective internal annular ribs through which securing bolts 64 are inserted into the flange 58. Springs 65 are fitted around the bolts between the flange 58 and the inner race carrier 63 and between the heads of the bolts and the outer race carrier 63, the bolts being held against withdrawal by locking rings 66 fitted in the hub sleeve 61 and bearing against the bolt heads. Races 67 are carried by the race carriers 63 and are maintained in rolling contact with the spheres 68 in the manner previously described, while a stationary race 69 is secured in the frame 70 and bears upon the balls or rolling elements 68 at the outer side thereof.

In this form of the invention, the driven race 71 is shown as having an arcuate or concave face 72 in contact with the rolling transmitting element 68, and the driven race is carried by a race carrier or hub 73, corresponding in all essential respects to the race carrier 47 shown in Fig. 2. A housing 74 is provided around the driven member and is fitted thereto by a ball bearing, the inner race 75 of which may be split, as shown, to facilitate assembling, and is held to the driven member by one or more set screws 76. The outer race 77 is held in position by set screws 78. The housing 74 has a substantially cylindrical extension 79 which fits around the projecting flange 80 of the frame 70 and the opposed faces of the extension 79 and the flange 80 are formed with cooperating worms or threads 81, while a handle or lever 82 is provided upon the outer side of the extension 79 so that, when desired, rotary motion may be imparted to the housing 74. When the housing is thus rotated, the threads or worms 81 will cause the same to also move longitudinally and this longitudinal movement will be transmitted to the driven member through the ball bearing and the set screws, and the point of contact between the balls 68 and the working face 72 will be thereby varied so that the driven element may be caused to rotate in the desired direction and at the desired speed. It is to be noted that in the position illustrated the point of contact between the balls 68 and the driven race is at the same radial distance from the driving shaft as the point of contact between the balls and the stationary race 69 so that the parts are in neutral position and no motion will be transmitted to the driven member.

In Fig. 4, I have shown a variation of the invention in which one of the inner races becomes the driven member. In this arrangement, the driving shaft 83 has one race 84 fixed thereon and the frame or machine casing 85 carries the two stationary outer races 86 which may be held in the frame by a stop ring 87. Disposed about the driving shaft 83 and supported thereon through a ball bearing 88 is a sleeve or hub member 89 carrying a race 90 which is in rolling contact with the balls or other rolling elements 91. It will be noted that the point of contact 92 between the driven race 90 and the spheres 91 is at a different radial distance from the axis of the driving shaft and also from the axis of rotation of the spheres than is the point of contact 93 with the driving race, the circle defining the rolling path upon the race 90 being greater than the circle defining the rolling path upon the race 84.

Figure 5:
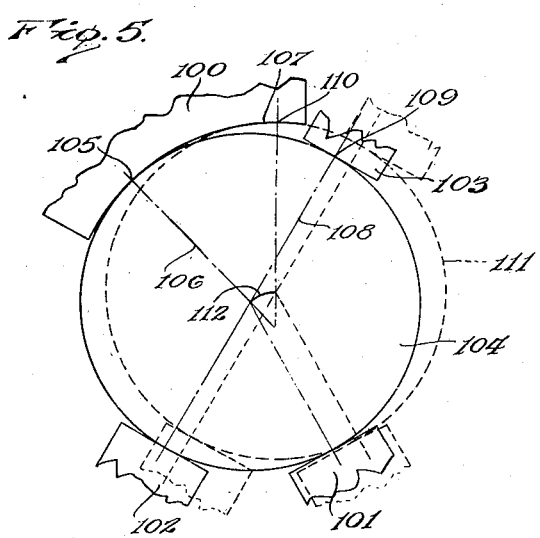

In the forms shown in Figs. 1 and 2, variation of the speeds and directions of rotation is accomplished by interchanging driven races, while in Fig. 3 such variation is obtained by longitudinal shifting of the driven element. The change of speed and direction of rotation, however, may be accomplished by shifting any of the races and the shifting may be accomplished by hand or by manipulation of mechanical elements provided for that purpose. In Fig. 5, I have illustrated diagrammatically the effect of shifting the non-rotating race, the arrangement shown in the diagram corresponding structurally to the arrangement illustrated in Fig. 3. In this diagram 100 designates the driven race, 101 and 102 designate the driving races, and 103 designates the non-rotatable race. The non-rotatable race 103 may be operated by a worm or lever and the races 101 and 102 are spring-pressed, as illustrated in Figs. 2 and 3. As shown in full lines in the diagram, the point of contact between the driven race 100 and the sphere 104 is at the point 105 defined by the meeting of the radial line 106 with the arcuate face 107 of the race. The radial line 108 which is at a right angle to the race 103 meets the latter race at the point 109 which is at a greater distance from the axis of rotation of the sphere than the point 105 and, consequently, in this position the driven race rotates forwardly at high speed in the same direction as the races 101 and 102. If the race 103 be moved toward the position shown in dotted lines, the point of contact 105 will be shifted along the face of the race 100 until, when the race 103 assumes the position shown in dotted lines, the point of contact between the sphere and the driven race will be at the point 110. The rolling path or the circle defined by the infinite number of points of contact with the race will, therefore, be gradually increased until it exceeds the circle defining the rolling path upon the race 103 so that transmission will pass to neutral and then to reverse and will gradually increase in speed in the reversed direction. As the race 103 is shifted toward and into the dotted line position, the presser springs acting upon the races 101 and 102 will move them into the respective positions, indicated by the dotted lines, and the sphere 104 will be thereby shifted to the dotted line position 111, the center of the sphere following the arc 112 which is concentric with the arcuate face of the driven race, the rolling contact between the spheres and the several races being thereby maintained in all adjustments.

In Fig. 6, I have illustrated diagrammatically an assembly corresponding to a two point ball bearing in which the driving race 113 and the stationary race 114 are disposed at diametrically opposite points of the sphere 115 and are provided with concave working faces, as indicated at 116. The driven race 117 may be disposed above the horizontal diameter of the sphere or below the same, as indicated by full and dotted lines respectively. In transmissions of this type, the rolling elements have a gyroscopic action which resists any rotary motion that is not about a line parallel with the axis of the driving shaft and passing through the centers of the respective rolling elements, this line corresponding with the axis of rotation of the elements in the several previously described arrangements. While the resistance of the driven race would apparently cause the rolling elements to rotate about their vertical axes or about lines which coincide with the central longitudinal lines of the races 113 and 114, the arrangement indicated by this diagram is especially adapted for very high speed light drive transmissions because the force transmitted is slight and, due to the high speed, the gyroscopic effect is very great and counteracts the tendency of the driven race to spin the rolling elements, and thereby causes the rolling elements to transmit motion to the driven element.

It will be noted that in all the described forms of the invention the motion is transmitted directly between the driving and the driven elements by the contact of rolling elements with opposed races and with a relatively stationary race. There are no costly machine elements, such as spiders or orbit elements and, consequently, I elminate the numerous bearings which were required by the use of planetary gears and spiders or other orbit members. I also avoid the frictional resistance to free rotation which was due to the use of such elements. The arrangement is very simple and compact and may be very readily assembled inasmuch as it utilizes the rolling bearings of machine units as the speed changing elements of the mechanism. The device is highly efficient and is adapted to slow speed heavy load mechanisms as well as to high speed light load mechanisms and, in such arrangements as is illustrated in Figs. 3 and 5, is capable of attaining any desired speed either forwardly or backwardly, while the use of spheres as the sole transmitting medium make it possible to transmit higher speeds than it is possible to transmit with gear mechanisms. The invention may be applied to automobiles, motorcycles, flying machines, steam ships, hand tools and any other mechanisms where it is desired to use a light weight high speed motor.

Having thus described the invention, I claim:

1. A transmission comprising a drive member, a collar fixed to said member, race carriers encircling the drive member at one side of the collar, bolts and springs cooperating with said collar to maintain said race carriers against relative rotation and urge them toward each other, races carried by said carriers, a plurality of rolling elements seating in said races, a non-rotatable race disposed about and engaging the rolling elements, a rotatable race disposed about and driven by the rolling elements, and operative means for effecting axial movement of one of the races.

2. A transmission comprising a drive member, a plurality of race carriers mounted on and rotatably fixed in relation to said member, springs holding said carriers toward each other, races fixed one to each of said carriers, a plurality of rolling elements seating in said races, a non-rotatable race disposed about and bearing on the rolling elements, a rotatable race disposed about and driven by the rotatable elements, the rotatable elements moving radially outward as the first-mentioned races approach to increase the speed of the driven race and the pressure of the rotatable elements decreasing as the speed of the driven race increases, and a worm connection between the stationary race and the driven rotatable race whereby to effect longitudinal adjustment of the driven rotatable race.

In testimony whereof I affix my signature.

JOHN A. GILMAN.